(12) United States Patent
Kim

(10) Patent No.: US 11,126,545 B2
(45) Date of Patent: Sep. 21, 2021

(54) MEMORY SYSTEM AND OPERATING METHOD THEREOF

(71) Applicant: SK hynix Inc., Gyeonggi-do (KR)

(72) Inventor: Do-Hun Kim, Gyeonggi-do (KR)

(73) Assignee: SK hynix Inc., Gyeonggi-do (KR)

(*) Notice: Subject to any disclaimer, the term of this patent is extended or adjusted under 35 U.S.C. 154(b) by 90 days.

(21) Appl. No.: 16/718,946

(22) Filed: Dec. 18, 2019

(65) Prior Publication Data
US 2020/0387446 A1 Dec. 10, 2020

(30) Foreign Application Priority Data

Jun. 10, 2019 (KR) .................. 10-2019-0067805

(51) Int. Cl.
| | |
|---|---|
| *G06F 12/00* | (2006.01) |
| *G06F 12/02* | (2006.01) |
| *G06F 12/0868* | (2016.01) |
| *G06F 9/30* | (2018.01) |
| *G06F 12/0882* | (2016.01) |
| *G06F 12/0815* | (2016.01) |

(52) U.S. Cl.
CPC ...... *G06F 12/0246* (2013.01); *G06F 9/30029* (2013.01); *G06F 9/30047* (2013.01); *G06F 12/0815* (2013.01); *G06F 12/0868* (2013.01); *G06F 12/0882* (2013.01)

(58) Field of Classification Search
CPC ............. G06F 12/0246; G06F 9/30029; G06F 9/30047; G06F 12/0815; G06F 12/0868; G06F 12/0882
See application file for complete search history.

(56) References Cited

U.S. PATENT DOCUMENTS 6,334,168 B1 * 12/2001 Islam .................. G06F 11/1076
711/111
2020/0210286 A1 * 7/2020 Kumar ................ G06F 11/1068

FOREIGN PATENT DOCUMENTS

| KR | 10-2010-0114999 | 10/2010 |
|---|---|---|
| KR | 10-2017-0101004 | 9/2017 |

* cited by examiner

*Primary Examiner* — Gurtej Bansal
(74) *Attorney, Agent, or Firm* — IP & T Group LLP

(57) ABSTRACT

A memory system includes a memory device, a write buffer for buffering first and second host data, a chip-kill cache for caching one among first and second chip-kill parity candidates for the first and second host data, respectively, a chip-kill buffer having a smaller bandwidth and a larger capacity than the chip-kill cache; a chip-kill manager for generating a first chip-kill parity by performing an XOR operation on the first host data and the first chip-kill parity candidate, and generating a second chip-kill parity by performing an XOR operation on the second host data and the second chip-kill parity candidate, and a processor for controlling the memory device to program the first host data and the first chip-kill parity into a first open block and to program the second host data and the second chip-kill parity into a second open block.

20 Claims, 9 Drawing Sheets

MEMORY SYSTEM AND OPERATING METHOD THEREOF

CROSS-REFERENCE TO RELATED APPLICATIONS

The present application claims priority to Korean Patent Application No. 10-2019-0067805, filed on Jun. 10, 2019, which is incorporated herein by reference in its entirety.

BACKGROUND

1. Field

Various embodiments of the present invention relate to a memory system, and more particularly, to a memory system for efficiently generating parity and a method for operating the memory system.

2. Description of the Related Art

The computer environment paradigm has shifted to ubiquitous computing, which enables computing systems to be used virtually anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since memory systems have no moving parts, as compared with a hard disk device. Examples of memory systems having such advantages include universal serial bus (USB) memory devices, memory cards having various interfaces, and solid state drives (SSDs).

SUMMARY

Embodiments of the present invention are directed to a memory system capable of generating a chip-kill parity by using a chip-kill cache disposed between a write buffer and a chip-kill buffer.

In accordance with an embodiment of the present invention, a memory system includes: a memory device; a write buffer suitable for buffering a first host data and a second host data; a chip-kill cache suitable for caching one among a first chip-kill parity candidate and a second chip-kill parity candidate for the first host data and the second host data, respectively; a chip-kill buffer suitable for buffering the first chip-kill parity candidate when the first chip-kill parity candidate cached in the chip-kill cache is evicted from the chip-kill cache; a chip-kill manager suitable for generating a first chip-kill parity by performing an XOR operation on the first host data and the first chip-kill parity candidate and generating a second chip-kill parity by performing an XOR operation on the second host data and the second chip-kill parity candidate; and a processor suitable for controlling the memory device to program the first host data and the first chip-kill parity into a first open block, and to program the second host data and the second chip-kill parity into a second open block, wherein the chip-kill buffer has a larger capacity than the chip-kill cache, and wherein, when the first chip-kill parity candidate is a cache hit in the chip-kill cache, the processor controls the chip-kill manager to read the first chip-kill parity candidate from the chip-kill cache and update the read first chip-kill parity candidate, and when the first chip-kill parity candidate is a cache miss in the chip-kill cache, the processor controls the chip-kill manager to read the first chip-kill parity candidate from the chip-kill buffer and update the read first chip-kill parity candidate.

In accordance with another embodiment of the present invention, a method for operating a memory system includes: buffering a first host data and a second host data in a write buffer; caching one among a first chip-kill parity candidate and a second chip-kill parity candidate for the first host data and the second host data in a chip-kill cache, respectively; buffering the first chip-kill parity candidate into a chip-kill buffer when the first chip-kill parity candidate cached in the chip-kill cache is evicted from the chip-kill cache; generating a first chip-kill parity by performing an XOR operation on the first host data and the first chip-kill parity candidate and generating a second chip-kill parity by performing an XOR operation on the second host data and the second chip-kill parity candidate; and programming the first host data and the first chip-kill parity into a first open block and programming the second host data and the second chip-kill parity into a second open block, wherein, when the first chip-kill parity candidate is a cache hit in the chip-kill cache, the first chip-kill parity candidate from the chip-kill cache is read and updated, and when the first chip-kill parity candidate is a cache miss in the chip-kill cache, the first chip-kill parity candidate from the chip-kill buffer is read and updated, the chip-kill buffer having a larger capacity than the chip-kill cache.

In accordance with another embodiment of the present invention, a memory system includes: a memory device including first and second open blocks; and a controller including a chip-kill cache and a chip-kill buffer having a capacity greater than the chip-kill cache, wherein the controller is suitable for: receiving host data including first data and second data from a host; determining whether first chip-kill parity candidate for the first data is cached in the chip-kill cache; when it is determined that the first chip-kill parity candidate is cached in the chip-kill cache, reading the first chip-kill parity candidate from the chip-kill cache; when it is determined that second chip-kill parity candidate for the second data is cached in the chip-kill cache, evicting a victim parity selected from the chip-kill cache, storing the victim parity in the chip-kill buffer, and reading the first chip-kill parity candidate from the chip-kill buffer; generating a first chip-kill parity based on the first data and the first chip-kill parity candidate and a second chip-kill parity based on the second data and the first chip-kill parity; and storing the first host data and the first chip-kill parity in the first open block, and the second host data and the second chip-kill parity in the second open block.

DETAILED DESCRIPTION

Figure 1:
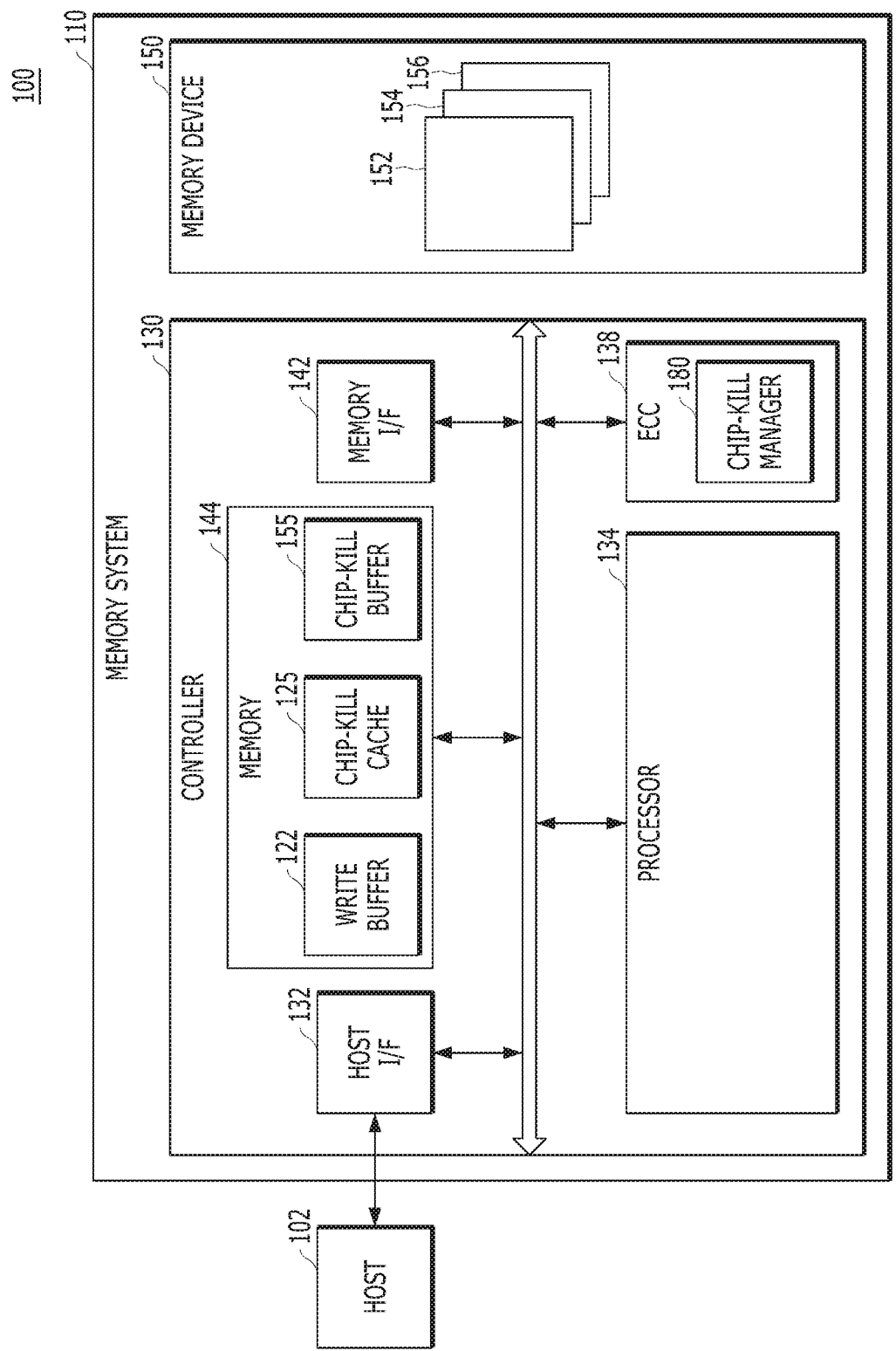
FIG. 1 is a block diagram illustrating a data processing system including a memory system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It will be understood that, although the terms "first", "second", "third", and the like may be used herein to identify various elements, these elements are not limited by these terms. These terms are used to distinguish one element from another element that otherwise have the same or similar names. Thus, a first element described below could also be termed as a second or third element without departing from the spirit and scope of the present invention.

The drawings are not necessarily to scale and, in some instances, proportions may have been exaggerated to clearly illustrate features of the embodiments. When an element is referred to as being connected or coupled to another element, it should be understood that the former can be directly connected or coupled to the latter, or electrically connected or coupled to the latter via one or more intervening elements.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for describing particular embodiments and is not intended to limit the present invention.

As used herein, singular forms are intended to include the plural forms and vice versa, unless the context clearly indicates otherwise.

It will be further understood that the terms "comprises," "comprising," "includes," and "including" when used in this specification, specify the presence of the stated elements but do not preclude the presence or addition of one or more other elements. As used herein, the term "and/or" includes any and all combinations of one or more of the listed items.

Unless otherwise defined, all terms including technical and scientific terms used herein have the same meaning as commonly understood by one of ordinary skill in the art to which the present invention pertains in view of the present disclosure. It will be further understood that terms, such as those defined in commonly used dictionaries, should be interpreted as having a meaning that is consistent with their meaning in the context of the present disclosure and the relevant art, and should not be interpreted in an idealized or overly formal sense unless expressly so defined herein.

In the following description, numerous specific details are set forth to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 including a memory system 110 in accordance with an embodiment of the present invention.

Referring to FIG. 1, the data processing system 100 may include a host 102 operatively coupled to the memory system 110.

The host 102 may include any of a variety of portable electronic devices such as a mobile phone, a MP3 player and a laptop computer, or any of a variety of non-portable electronic devices such as a desktop computer, a game machine, a television (TV) and a projector.

The host 102 may include at least one operating system (OS), which may manage and control overall functions and operations of the host 102. The OS may support an operation between the host 102 and a user using the data processing system 100 or the memory system 110. The OS may support functions and operations requested by a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS may be configured to support a function of providing a mobile service to users, and a power saving function of a system may include Android, iOS and Windows Mobile. The host 102 may include a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request.

The memory system 110 may store data for the host 102 in response to a request of the host 102. Non-limiting examples of the memory system 110 include a solid state drive (SSD), a multi-media card (MMC), a secure digital (SD) card, a universal storage bus (USB) device, a universal flash storage (UFS) device, a compact flash (CF) card, a smart media card (SMC), a personal computer memory card international association (PCMCIA) card and a memory stick. The MMC may include an embedded MMC (eMMC), a reduced size MMC (RS-MMC) and micro-MMC. The SD card may include a mini-SD card and micro-SD card.

The memory system 110 may include various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a controller 130 and a memory device 150. The memory device 150 may store data for the host 102, and the controller 130 may control data storage into the memory device 150.

The controller 130 and the memory device 150 may be integrated into a single semiconductor device, which may be included in any of the various types of memory systems as described above. For example, the controller 130 and the memory device 150 may be integrated as a single semiconductor device to constitute an SSD. When the memory system 110 is used as an SSD, the operating speed of the host 102 connected to the memory system 110 can be improved. In another example, the controller 130 and the memory device 150 may be integrated as a single semiconductor device to constitute a memory card such as a personal computer memory card international association (PCMCIA) card, a compact flash (CF) card, a smart media card (SMC), a memory stick, a multimedia card (MMC) (e.g., a RS-MMC and a micro-MMC), a secure digital (SD) card (e.g., a mini-SD, a micro-SD and a SDHC), or a universal flash storage (UFS) device.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies, and each memory die may include a plurality of planes. Each plane may include a plurality of memory blocks 152 to 156, each of which may include a plurality of pages, each of which may include a plurality of memory cells coupled to a word line. In an embodiment, the memory device 150 may be a flash memory having a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program, and erase operations of the memory device 150.

Specifically, the controller 130 may include a host interface (I/F) 132, a processor 134, an error correction code (ECC) component 138, a memory interface (I/F) 142, and a memory 144, all operatively coupled or engaged via an internal bus. The memory 144 may include a write buffer 122, a chip-kill cache 125, and a chip-kill buffer 155. Alternatively, the write buffer 122, the chip-kill cache 125, and the chip-kill buffer 155 may be implemented outside of the memory 144. The ECC component 138 may include a chip-kill manager 180.

The host interface 132 may process a command and data of the host 102. The host interface 132 may communicate with the host 102 through one or more of various interface protocols such as universal serial bus (USB), multi-media card (MMC), peripheral component interconnect-express (PCI-e or PCIe), small computer system interface (SCSI), serial-attached SCSI (SAS), serial advanced technology attachment (SATA), parallel advanced technology attachment (PATA), enhanced small disk interface (ESDI) and integrated drive electronics (IDE). The host interface 132 may be driven via firmware, that is, a host interface layer (HIL) for exchanging data with the host 102.

The ECC component 138 may correct error bits of data to be processed by the memory device 150 and may include an ECC encoder and an ECC decoder. The ECC encoder may perform an error correction encoding on data to be programmed into the memory device 150 to generate data to which a parity bit is added. The data including the parity bit may be stored in the memory device 150. The ECC decoder may detect and correct an error contained in the data read from the memory device 150. In other words, the ECC component 138 may perform an error correction decoding process to the data read from the memory device 150 through an ECC code used during an ECC encoding process. According to a result of the error correction decoding process, the ECC component 138 may output a signal, for example, an error correction success or fail signal. When the number of error bits is greater than a threshold value of correctable error bits, the ECC component 138 may not correct the error bits, and instead may output the error correction fail signal.

The ECC component 138 may perform error correction through a coded modulation such as a Low Density Parity Check (LDDC) code, a Bose-Chaudhri-Hocquenghem (BCH) code, a turbo code, a Reed-Solomon code, a convolution code, a Recursive Systematic Code (RSC), a Trellis-Coded Modulation (TCM) and a Block coded modulation (BCM). However, the ECC component 138 is not limited to these error correction techniques. As such, the ECC component 138 may include any and all circuits, modules, systems or devices for performing suitable error correction.

The memory interface 142 may serve as a memory/storage interface between the controller 130 and the memory device 150 such that the controller 130 may control the memory device 150 in response to a request from the host 102.

The memory 144 may serve as a working memory of the memory system 110 and the controller 130, and store data for driving the memory system 110 and the controller 130. The controller 130 may control the memory device 150 to perform read, program, and erase operations in response to a request from the host 102. The controller 130 may provide data read from the memory device 150 to the host 102, and may store data provided from the host 102 into the memory device 150. The memory 144 may store data required for the controller 130 and the memory device 150 to perform these operations.

The memory 144 may be a volatile memory. For example, the memory 144 may be a static random access memory (SRAM) or dynamic random access memory (DRAM). The memory 144 may be disposed within or external to the controller 130. FIG. 1 shows the memory 144 disposed within the controller 130. Alternatively, the memory 144 may be an external volatile memory having a memory interface for transferring data between the memory 144 and the controller 130.

As described above, the memory 144 may include a program memory, a data memory, a write buffer/cache, a read buffer/cache, a data buffer/cache and a map buffer/cache to store some data required to perform data write and read operations between the host 102 and the memory device 150, and other data required for the controller 130 and the memory device 150 to perform these operations.

The processor 134 may control overall operations of the memory system 110. The processor 134 may use firmware to control the overall operations of the memory system 110. The firmware may be referred to as flash translation layer (FTL).

The controller 130 may perform an operation requested by the host 102 in the memory device 150 through the processor 134, which is implemented as a microprocessor or a central processing unit (CPU). Also, the controller 130 may perform a background operation on the memory device 150 through the processor 134. The background operation may include an operation of copying and processing data stored in some memory blocks among the memory blocks 152 to 156 of the memory device 150 into other memory blocks, e.g., a garbage collection (GC) operation. Further, the background operation may include an operation of performing swapping between the memory blocks 152 to 156 or between the data of the memory blocks 152 to 156, e.g., a wear-leveling (WL) operation. Further, the background operation may include an operation of storing the map data stored in the controller 130 in the memory blocks 152 to 156, e.g., a map flush operation. Furthermore, the background operation may include an operation of managing bad blocks of the memory device 150, e.g., a bad block management operation of detecting and processing bad blocks among the memory blocks 152 to 156 in the memory device 150.

Figure 2:
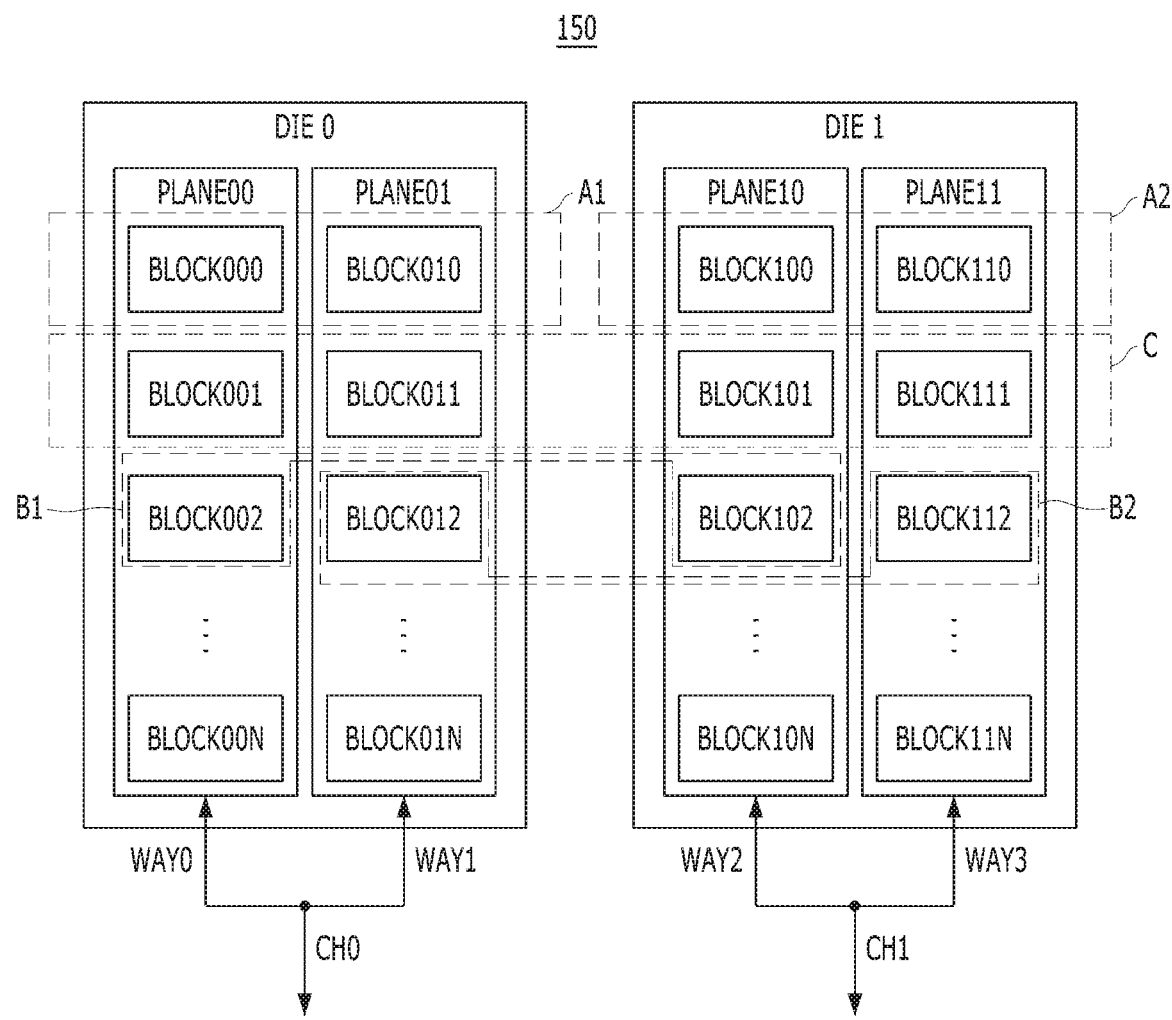
FIG. 2 is a block diagram illustrating a concept of a super memory block used in a memory system in accordance with an embodiment of the present invention.

FIG. 2 is a diagram illustrating a concept of a super memory block used in a memory system in accordance with an embodiment of the present invention.

It is noted that FIG. 2 illustrates in detail constituent elements of the memory device 150 among the constituent element of the memory system 110 shown in FIG. 1.

The memory device 150 may include a plurality of memory blocks BLOCK000 to BLOCK00N, BLOCK010 to BLOCK01N, BLOCK100 to BLOCK10N and BLOCK110 to BLOCK11N.

The memory device 150 may include a first memory die DIE0 capable of inputting and outputting data through a zeroth channel CH0 and a second memory die DIE1 capable of inputting and outputting data through a first channel CH1. The zeroth and first channels CH0 and CH1 may input and output data in an interleaving scheme.

The first memory die DIE0 may include a plurality of planes PLANE00 and PLANE01 respectively corresponding to a plurality of ways WAY0 and WAY1. The ways WAY0 and WAY1 may input and output data in the interleaving scheme by sharing the zeroth channel CH0.

The second memory die DIE1 may include a plurality of planes PLANE 10 and PLANE 11 respectively corresponding to a plurality of ways WAY2 and WAY3. The ways WAY2 and WAY3 may input and output data in the interleaving scheme by sharing the first channel CH1.

The first plane PLANE00 of the first memory die DIE0 may include a predetermined number of memory blocks BLOCK000 to BLOCK00N among the plurality of memory blocks BLOCK000 to BLOCK00N, BLOCK010 to BLOCK01N, BLOCK100 to BLOCK10N and BLOCK110 to BLOCK11N.

The second plane PLANE01 of the first memory die DIE0 may include a predetermined number of memory blocks BLOCK010 to BLOCK01N among the plurality of memory blocks BLOCK000 to BLOCK00N, BLOCK010 to BLOCK01N, BLOCK100 to BLOCK10N and BLOCK110 to BLOCK11N.

The first plane PLANE10 of the second memory die DIE1 may include a predetermined number of memory blocks BLOCK100 to BLOCK10N among the plurality of memory blocks BLOCK000 to BLOCK00N, BLOCK010 to BLOCK01N, BLOCK100 to BLOCK10N and BLOCK110 to BLOCK11N.

The second plane PLANE11 of the second memory die DIE1 may include a predetermined number of memory blocks BLOCK110 to BLOCK11N among the plurality of memory blocks BLOCK000 to BLOCK00N, BLOCK010 to BLOCK01N, BLOCK100 to BLOCK10N and BLOCK110 to BLOCK11N.

In this manner, the plurality of memory blocks BLOCK000 to BLOCK00N, BLOCK010 to BLOCK01N, BLOCK100 to BLOCK10N and BLOCK110 to BLOCK11N in the memory device 150 may be divided into groups, according to their physical locations and their use of the ways and channels.

Although it is described in the embodiment of the present invention that two memory dies DIE0 and DIE1 are included in the memory device 150, two planes PLANE00 and PLANE01/PLANE10 and PLANE11 are included in the respective memory dies DIE0 and DIE1, and the predetermined number of memory blocks BLOCK000 to BLOCK00N, BLOCK010 to BLOCK01N, BLOCK100 to BLOCK10N and BLOCK110 to BLOCK11N are included in the respective planes PLANE00 and PLANE01/ PLANE10 and PLANE11, the invention is not limited in this way. In actuality, more or fewer memory dies than two may be included in the memory device 150, more or fewer planes than two may be included in the respective memory dies, according to the decision of a system designer. Besides, the predetermined number of memory blocks in the respective planes may be also variously adjusted according to the decision of the system designer.

Differently from such a way to divide the plurality of memory blocks BLOCK000 to BLOCK00N, BLOCK010 to BLOCK01N, BLOCK100 to BLOCK10N and BLOCK110 to BLOCK11N in the memory device 150 depending on their physical locations such as the memory dies DIE0 and DIE1 or the planes PLANE00 and PLANE01 PLANE10 and PLANE11, the controller 130 may use a way to divide the plurality of memory blocks BLOCK000 to BLOCK00N, BLOCK010 to BLOCK01N, BLOCK100 to BLOCK10N and BLOCK110 to BLOCK11N on a basis of memory blocks which are simultaneously selected and operate there among. In other words, the controller 130 may manage a plurality of memory blocks which are located in different dies or different planes based on their physical locations, by grouping memory blocks capable of being selected simultaneously among the plurality of memory blocks and thereby dividing the grouped memory blocks into super memory blocks.

The simultaneous selection scheme of grouping the memory blocks into super memory blocks by the controller 130 may be performed in various manners according to the decision of the system designer. Herein, three simultaneous selection schemes will be exemplified as follows.

A first scheme is to group an arbitrary memory block BLOCK000 from the first plane PLANE00 and an arbitrary memory block BLOCK010 from the second plane PLANE01 of the first memory die DIE0 among the memory dies DIE0 and DIE1 in the memory device 150 and manage the grouped memory blocks BLOCK000 and BLOCK010 as a single super memory block A1. When the first scheme is applied to the second memory die DIE1 among the memory dies DIE0 and DIE1 in the memory device 150, the controller 130 may group an arbitrary memory block BLOCK100 from the first plane PLANE10 and an arbitrary memory block BLOCK110 from the second plane PLANE11 of the second memory die DIE1 and manage the grouped memory blocks BLOCK100 and BLOCK110 as a single super memory block A2.

A second scheme is to group an arbitrary memory block BLOCK002 from the first plane PLANE00 of the first memory die DIE0 and an arbitrary memory block BLOCK102 from the first plane PLANE10 of the second memory die DIE1 and manage the grouped memory blocks BLOCK002 and BLOCK102 as a single super memory block B1. In addition, according to the second scheme, the controller 130 may group an arbitrary memory block BLOCK012 from the second plane PLANE01 of the first memory die DIE0 and an arbitrary memory block BLOCK112 from the second plane PLANE11 of the second memory die DIE1 and manage the grouped memory blocks BLOCK012 and BLOCK112 as a single super memory block B2.

A third scheme is to group an arbitrary memory block BLOCK001 from the first plane PLANE00 of the first memory die DIE0, an arbitrary memory block BLOCK011 from the second plane PLANE01 of the first memory die DIE0, an arbitrary memory block BLOCK101 from the first plane PLANE10 of the second memory die DIE1, and an arbitrary memory block BLOCK111 from the second plane PLANE11 of the second memory die DIE1 and manage the grouped memory blocks BLOCK001, BLOCK011, BLOCK101 and BLOCK111 as a single super memory block C.

The memory blocks in the respective super memory blocks may be simultaneously selected by the controller 130 through an interleaving scheme. For example, the interleaving scheme may include a channel interleaving scheme, a memory die interleaving scheme, a memory chip interleaving scheme or a way interleaving scheme.

Figure 3:
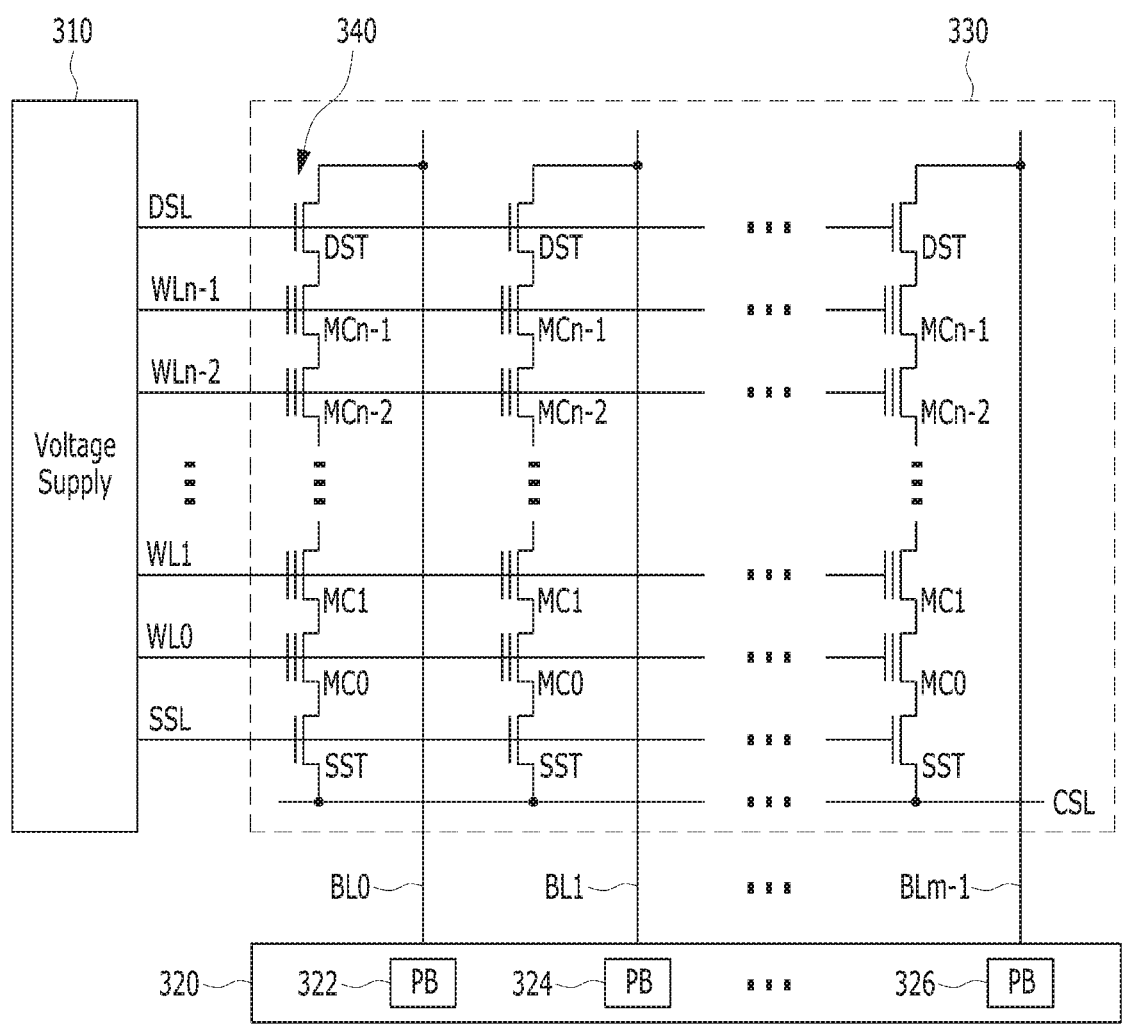
FIG. 3 is a circuit diagram illustrating a memory cell array of a memory block in the memory device shown in FIG. 1.

FIG. 3 is a circuit diagram illustrating a memory cell array of a memory block 330 in the memory device 150 shown in FIG. 1.

Referring to FIG. 3, the memory block 330 may include a plurality of cell strings 340 coupled to a plurality of corresponding bit lines BL0 to BLm-1. The cell string 340 of each column may include one or more drain select transistors DST and one or more source select transistors SST. Between the drain and source select transistors DST and SST, a plurality of memory cells MC0 to MCn-1 may be coupled in series. In an embodiment, each of the memory cell transistors MC0 to MCn-1 may be embodied by a multi-level cell (MLC) capable of storing data information of a plurality of bits. Each of the cell strings 340 may be electrically coupled to a corresponding bit line among the plurality of bit lines BL0 to BLm-1. For example, as illustrated in FIG. 3, the first cell string is coupled to the first bit line BL0, and the last cell string is coupled to the last bit line BLm-1.

Although FIG. 3 illustrates NAND flash memory cells, the present disclosure is not limited thereto. It is noted that the memory cells may be NOR flash memory cells, or hybrid flash memory cells including two or more types of memory cells combined therein. Also, it is noted that the memory device 150 may be a flash memory device including a conductive floating gate such as a charge storage layer or a charge trap flash (CTF) memory device including an insulation layer as a charge storage layer.

The memory device 150 may further include a voltage supply 310 which generates different word line voltages including a program voltage, a read voltage, and a pass voltage to supply to the word lines according to an operation mode. The voltage generation operation of the voltage supply 310 may be controlled by a control circuit (not illustrated). Under the control of a control circuit (not shown), the voltage supply 310 may select at least one of the memory blocks (or sectors) of the memory cell array, select at least one of the word lines of the selected memory block, and provide the word line voltages to the selected word line(s) and the unselected word lines.

The memory device 150 may include a read/write circuit 320 which is controlled by the control circuit. During a verification/normal read operation, the read/write circuit 320 may operate as a sense amplifier for reading (i.e., sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive, from a buffer (not illustrated), data to be stored into the memory cell array, and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

As described earlier with reference to FIG. 1, the ECC component 138 may be able to detect and correct an error in the data that are read from the memory device 150 by using an LDPC code. When the ECC component 138 fails to correct the error, the data stored in the memory system 110 may be lost. Therefore, an additional method for recovering the data from an uncorrectable error may be required to improve the data reliability when the ECC component 138 fails to correct the error. The controller 130 may be able to protect the data by further performing a chip-kill operation. The chip-kill operation may recover the data which is not recovered as a result of an error correction operation.

Figure 4:
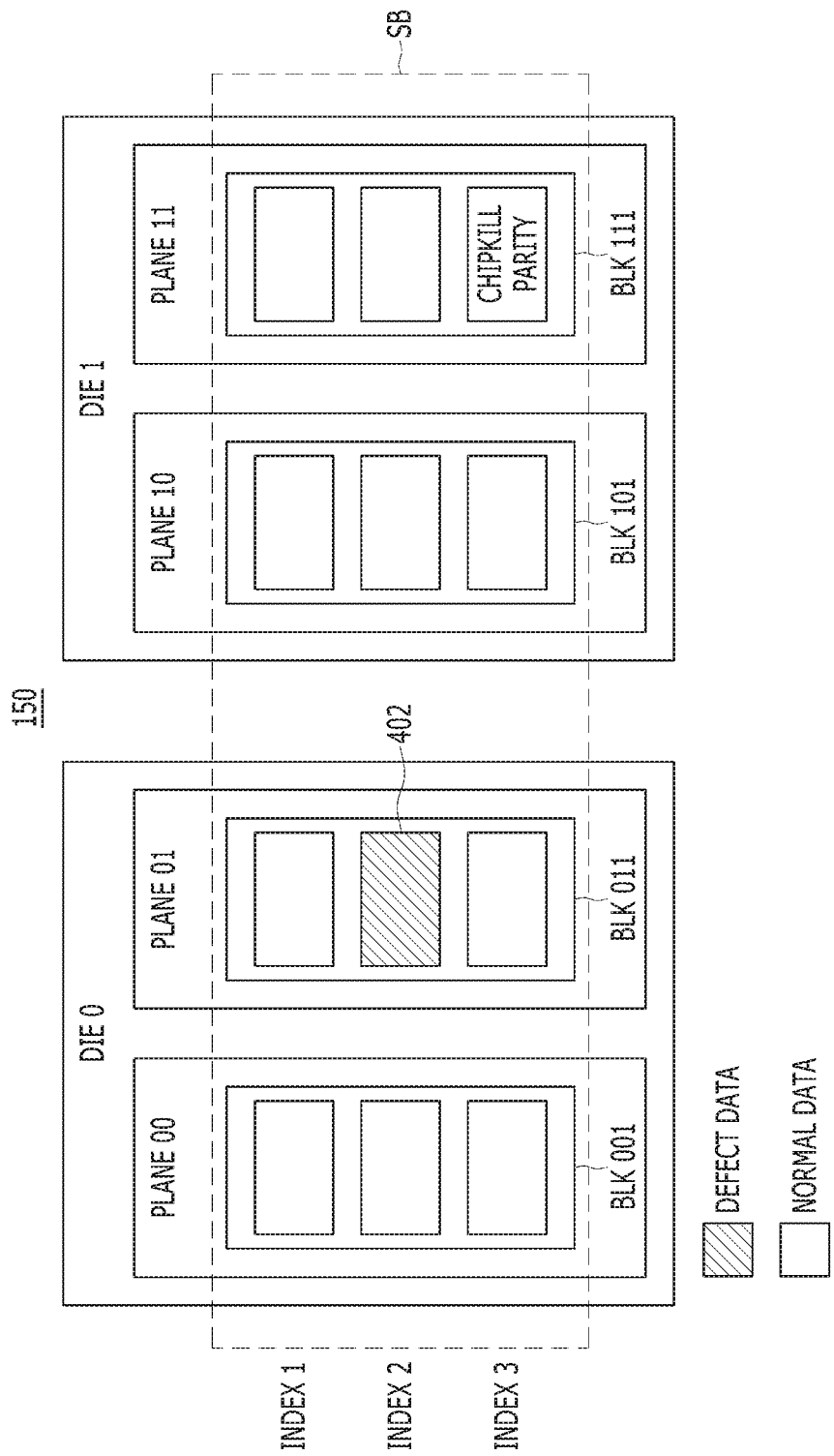
FIG. 4 illustrates a concept of a chip-kill operation.

FIG. 4 illustrates a concept of a chip-kill operation.

In FIG. 4, a method of forming a super memory block according to the third scheme described above with reference to FIG. 2 will be described as an example.

A super memory block SB may include first to fourth blocks BLK001 to BLK111. As an example, in FIG. 4 each of the first to fourth blocks BLK001 to BLK111 includes three pages. Therefore, the super memory block SB may include a total of 12 pages.

The controller 130 may control the memory device 150 to program host data in the 11 pages except for one page associated with a chip-kill parity CHIPKILL PARITY, among the 12 pages in the super memory block SB. The host data may be formed of 11 pieces of data, and each of the 11 pieces of data may correspond to a page. In other words, each of the 11 pieces of data may have one page size. The controller 130 may control the memory device 150 to program the chip-kill parity CHIPKILL PARITY in the corresponding one page among the pages in the super memory block SB. The chip-kill parity CHIPKILL PARITY may be a result of performing an XOR operation on all of the pieces of data programmed in the super memory block SB.

When a failure occurs in a particular piece of data programmed in the super memory block SB, the controller 130 may recover the original data based on the chip-kill parity. For example, when an error in a piece of data programmed in a particular page 402 of the super memory block SB is not corrected, the controller 130 may control the memory device 150 to read the remaining pieces of host data except for the piece of data in the page 402 among the data programmed in the super memory block SB and to read the chip-kill parity.

Since the chip-kill parity CHIPKILL PARITY is a result of performing an XOR operation on all of the pieces of data programmed in the super memory block SB, the original data of the failure page may be obtained by performing an XOR operation on the chip-kill parity CHIPKILL PARITY and the remaining pieces of data. Therefore, the controller 130 may be able to provide the host 102 with the original data of the failure page.

Referring back to FIG. 1, after the controller 130 buffers host data in the write buffer 122 and then forms a write stripe unit, the controller 130 may control the memory device 150 to program the host data in an open block OPEN BLK. The write stripe unit may be a sum of sizes of pages located at the same index of a super memory block. According to an embodiment of the present invention, the open block OPEN BLK may be a super memory block formed in the same manner as the super memory block SB which is described above with reference to FIG. 4.

Also, the controller 130 may perform a chip-kill parity generation operation while the host data buffered in the write buffer 122 is programmed in a super memory block. The controller 130 may divide the host data, which is to be stored in each of the remaining pages (hereinafter, the user pages) except for one page in which the chip-kill parity is to be programmed, among pages in an open block, into a plurality of pieces of data. The host data programmed in the first page of the user pages may be a start piece of data, and the host data programmed in the last page of the user pages may be a last piece of data, and the remaining host data except for the start piece of data and the last piece of data may be intermediate pieces of data.

Figure 5A:
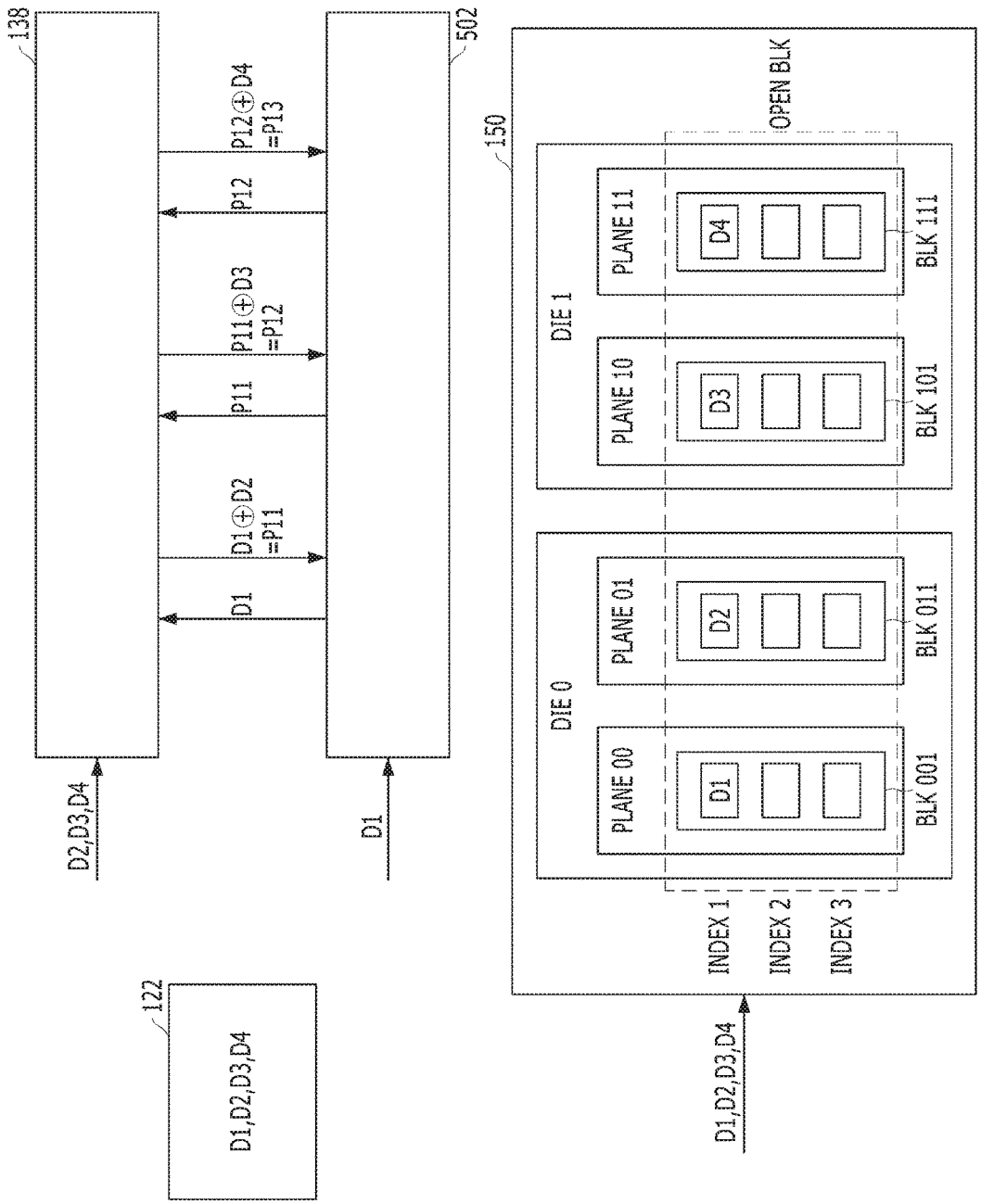
FIGS. 5A to 5C are block diagrams illustrating a method of generating a chip-kill parity.
Figure 5B:
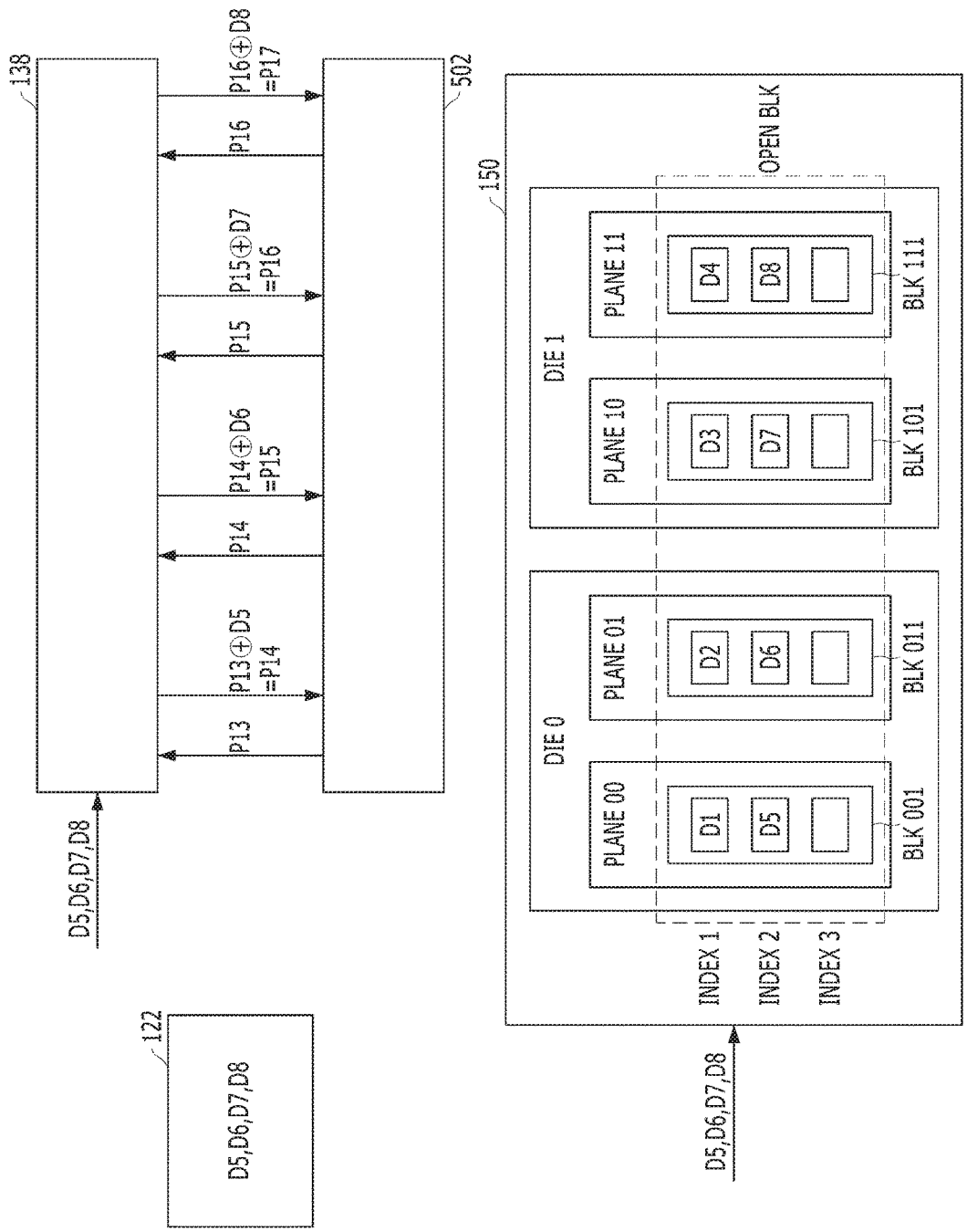
Figure 5C:
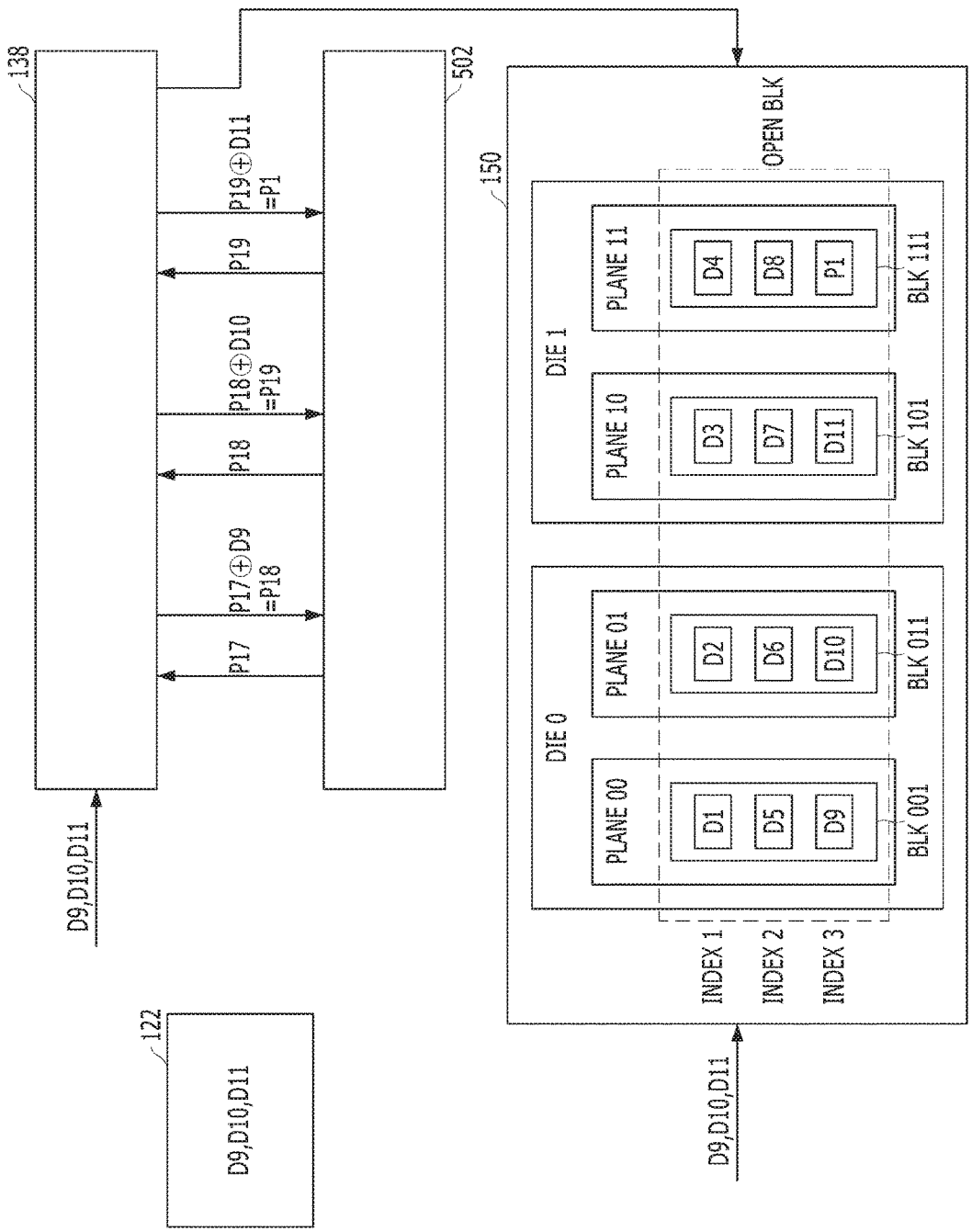

FIGS. 5A to 5C are block diagrams illustrating a method of generating a chip-kill parity.

FIG. 5A is a block diagram illustrating a process of generating a chip-kill parity when the host data buffered in the write buffer 122 includes the start piece of data.

Referring to FIG. 5A, when the host data buffered in the write buffer 122 forms a write stripe unit and the host data includes the start piece of data D1, the processor 134 may buffer the start piece of data D1 in a chip-kill buffer 502. The processor 134 may read the start piece of data D1 and provide the ECC component 138 with the read start piece of data D1. Also, the processor 134 may provide the ECC component 138 with the remaining pieces of data D2, D3 and D4 of the host data, except for the start piece of data D1.

The ECC component 138 may perform an XOR operation on the provided start piece of data D1 and a first piece of data D2, which is one among the intermediate pieces of data D2, D3 and D4 that are included in the host data so as to perform a first chip-kill parity candidate P11, and buffer the first chip-kill parity candidate P11 in the chip-kill buffer 502. The processor 134 may read the first chip-kill parity candidate P11 and provide the ECC component 138 with the read first chip-kill parity candidate P11.

The ECC component 138 may perform an XOR operation on the provided first chip-kill parity candidate P11 and a second piece of data D3, which is one among the remaining intermediate pieces of data D3 and D4 that are included in the host data so as to generate a second chip-kill parity candidate P12, and buffer the second chip-kill parity candidate P12 in the chip-kill buffer 502. The processor 134 and the ECC component 138 may repeatedly perform the above-described operation on the remaining piece of data D4 in the host data that form the write stripe unit.

In FIG. 5A, a total of four pages share a first index INDEX1 of the super memory block, and the sum of the sizes of the pages may form a write stripe unit. When the first to fourth data D1 to D4 are buffered in the corresponding pages that share the first index INDEX1 of the super memory block in the write buffer 122, the controller 130 may control the memory device 150 to program the first to fourth data D1 to D4 in an open block OPEN BLK.

The first data D1 may be a start piece of data that is stored in the first page of the user pages of the super memory block, and the second to fourth data D2 to D4 may be intermediate pieces of data. The processor 134 may provide the ECC component 138 with the second to fourth data D2 to D4 while programming the first to fourth data D1 to D4. Also, the processor 134 may buffer the first data D1, which is the start piece of data, in the chip-kill buffer 502. The processor 134 may read the first data D1 and provide the ECC component 138 with the first data D1.

The ECC component 138 may generate a first chip-kill parity candidate P11 by performing an XOR operation on the first data D1 provided from the chip-kill buffer 502 and the second data D2 provided from the write buffer 122. The ECC component 138 may buffer the first chip-kill parity candidate P11 in the chip-kill buffer 502. The processor 134 may read the first chip-kill parity candidate P11 and provide the ECC component 138 with the read first chip-kill parity candidate P11. The ECC component 138 may generate a second chip-kill parity candidate P12 by performing an XOR operation on the first chip-kill parity candidate P11 and a third data D3. The ECC component 138 may buffer the second chip-kill parity candidate P12 in the chip-kill buffer 502. In the same manner, the processor 134 and the ECC component 138 may generate a third chip-kill parity candidate P13 by performing an XOR operation on the second chip-kill parity candidate P12 and a fourth data D4.

FIG. 5B is a block diagram illustrating a process of generating a chip-kill parity when the host data buffered in the write buffer includes only intermediate pieces of data.

Referring to FIG. 5B, when pieces of data D5, D6, D7 and D8 of the host data buffered in the write buffer 122 are all intermediate pieces of data, the processor 134 may control the memory device 150 to program the host data forming a write stripe unit in an open block OPEN BLK. Also, the processor 134 may provide the ECC component 138 with the pieces of data D5, D6, D7 and D8, and read a third chip-kill parity candidate P13 for the open block OPEN BLK from the chip-kill buffer 502 and provide the ECC component 138 with the read third chip-kill parity candidate P13.

The ECC component 138 may generate a fourth chip-kill parity candidate P14 by performing an XOR operation on the provided third chip-kill parity candidate P13 and one piece of data D5 among the intermediate pieces of data D5, D6, D7 and D8 in the host data. The ECC component 138 may buffer the fourth chip-kill parity candidate P14 in the chip-kill buffer 502. The processor 134 and the ECC component 138 may perform a chip-kill parity generation operation by repeatedly performing an above-described XOR operation on the remaining intermediate pieces of data D6, D7, and D8.

For example, as described above with reference to FIG. 5A, when the first to fourth data of data D1 to D4 are programmed in the open block OPEN BLK and the third chip-kill parity candidate P13 is generated, the processor 134 may check whether the pieces of data D5 to D8 buffered in the write buffer 122 include a start piece of data or a last piece of data. Since all of the fifth to eighth data D5 to D8 buffered in the write buffer 122 are intermediate pieces of data, the processor 134 may control the memory device 150 to program the fifth to eighth data D5 to D8 that form a write stripe unit into the open block OPEN BLK. The processor 134 may provide the ECC component 138 with the fifth to eighth data D5 to D8 while the fifth to eighth data D5 to D8 are programmed. Also, the processor 134 may read the third chip-kill parity candidate P13 buffered in the chip-kill buffer 502 and provide the ECC component 138 with the read third chip-kill parity candidate P13.

The ECC component 138 may generate a fourth chip-kill parity candidate P14 by performing an XOR operation on the provided third chip-kill parity candidate P13 and the fifth data D5. The ECC component 138 may buffer the fourth chip-kill parity candidate P14 in the chip-kill buffer 502. The processor 134 may read the fourth chip-kill parity candidate P14 from the chip-kill buffer 502 and provide the ECC component 138 with the read fourth chip-kill parity candidate P14. The ECC component 138 may generate a fifth chip-kill parity candidate P15 by performing an XOR operation on the provided fourth chip-kill parity candidate P14 and the sixth data D6. Likewise, the processor 134 and the ECC component 138 may generate a sixth chip-kill parity candidate P16 by performing an XOR operation on the fifth chip-kill parity candidate P15 and the seventh data D7, and may generate a seventh chip-kill parity candidate P17 by performing an XOR operation on the sixth chip-kill parity candidate P16 and the eighth data D8. The ECC component 138 may buffer the seventh chip-kill parity candidate P17 in the chip-kill buffer 502.

FIG. 5C is a block diagram illustrating a method for generating a chip-kill parity when the host data buffered in the write buffer 122 includes a last piece of data.

Referring to FIG. 5C, when the host data D9, D10 and D11 buffered in the write buffer 122 include the last piece of data D11, the processor 134 may control the memory device 150 to program the host data D9, D10 and D11 in an open block OPEN BLK, When the host data includes the last piece of data D11, the size of the host data D9, D10 and D11 provided to the memory device 150 may be smaller by one page size than the write stripe unit. Also, the processor 134 may provide the ECC component 138 with the host data D9, D10 and D11, and the processor 134 may read the seventh chip-kill parity candidate P17 for the open block OPEN BLK buffered in the chip-kill buffer 502 and provide the ECC component 138 with the read seventh chip-kill parity candidate P17.

The ECC component 138 may be able to generate an eighth chip-kill parity candidate P18 by performing an XOR operation on the provided seventh chip-kill parity candidate P17 and the intermediate piece of data D9. The ECC component 138 may buffer the eighth chip-kill parity candidate P18 in the chip-kill buffer 502. The processor 134 and the ECC component 138 may be able to finally generate a chip-kill parity P1 for the open block OPEN BLK by repeatedly performing the above-described operation on the remaining intermediate piece of data D10 and the last piece of data D11. The processor 134 may control the memory device 150 to program the generated chip-kill parity P1 into the remaining one blank page except for the user pages of the open block OPEN BLK.

For example, as described above with reference to FIGS. 5A and 5B, when the fifth to eighth data D5 to D8 are programmed in the open block OPEN BLK and the seventh chip-kill parity candidate P17 is generated, the processor 134 may check whether or not the pieces of data D9, D10, and D11 of the host data buffered in the write buffer 122 include the last piece of data. Since the $11^{th}$ data D11 buffered in the write buffer 122 is the last piece of data, the processor 134 may control the memory device 150 to program the ninth to $11^{th}$ data D9 to D11, which are smaller by one page size than the write stripe unit, into the open block OPEN BLK. The processor 134 may provide the eCC component 138 with the ninth to $11^{th}$ data D9 to D11 while programming the ninth to $11^{th}$ data D9 to D11 into the open block OPEN BLK. Also, the processor 134 may provide the ECC component 138 with the seventh chip-kill parity candidate P17 which is buffered in the chip-kill buffer 502.

The ECC component 138 may generate an eighth chip-kill parity candidate P18 by performing an XOR operation on the provided seventh chip-kill parity candidate P17 and the ninth data D9. The ECC component 138 may buffer the eighth chip-kill parity candidate P18 in the chip-kill buffer 502. The processor 134 may read the eighth chip-kill parity candidate P18 from the chip-kill buffer 502 and provide the ECC component 138 with the eighth chip-kill parity candidate P18. The ECC component 138 may generate a ninth chip-kill parity candidate P19 by performing an XOR operation on the provided eighth chip-kill parity candidate P18 and the $10^{th}$ data D10. Likewise, the processor 134 and the ECC component 138 may finally generate a chip-kill parity P1 for the open block OPEN BLK by performing an XOR operation on the ninth chip-kill parity candidate P19 and the $11^{th}$ data D11. The processor 134 may control the memory device 150 to program the chip-kill parity P1 in the open block OPEN BLK.

Chip-kill buffers may require approximately twice as high bandwidth as a host write. For example, whereas host data are provided once to the memory device in the case of the host write, in the case of the chip-kill buffer, a chip-kill parity candidate may be read from the chip-kill buffer, and then a result of performing an XOR operation on the chip-kill parity candidate and the host data may be written back into the chip-kill buffer. Therefore, the size of the data processed per unit time may be approximately twice as much. In general, the chip-kill buffer may be realized with a static random access memory (SRAM) having a large bandwidth.

Although a method of generating a chip-kill parity when there is one open block is described above with reference to FIGS. 5A to 5C, there may be a plurality of open blocks just as in the case that the memory system 110 is coupled to a plurality of hosts through a plurality of write streams. When the number of open blocks increases, the size of a chip-kill parity candidate to be stored by a chip-kill buffer may also increase as well. In general, since SRAM is very expensive, the size of the SRAM in the memory system 110 is restrictive. When an increase in the size of the chip-kill buffer is required as the number of open blocks increases, the chip-kill buffer may be realized with a DRAM because it is difficult to realize a high-capacity chip-kill buffer as an SRAM. The DRAM does not support high throughput because the bandwidth is smaller than that of the SRAM. Therefore, when the chip-kill buffer is realized with a DRAM having a low bandwidth, the rate of generating the chip-kill parity may be very slow.

According to the embodiment of the present invention, the controller 130 may perform a chip-kill parity generation operation of performing an XOR operation on host data of a write stripe unit and the chip-kill parity candidate stored in an SRAM having a high bandwidth as a cache, while programming the host data using the SRAM. When the host data for a first open block is a cache hit, the controller 130 may be able to perform a chip-kill parity generation operation by reading a chip-kill parity candidate for the first open block from the SRAM. In other words, the controller 130 may read a chip-kill parity candidate for the first open block from the SRAM and perform a chip-kill parity operation of performing an XOR operation on the read chip-kill parity candidate and the host data for the first open block. When the host data for the first open block is a cache miss and the capacity of the SRAM is insufficient, the controller 130 may evict the chip-kill parity candidate for a second open block stored in the SRAM and store it in the DRAM.

Figure 6:
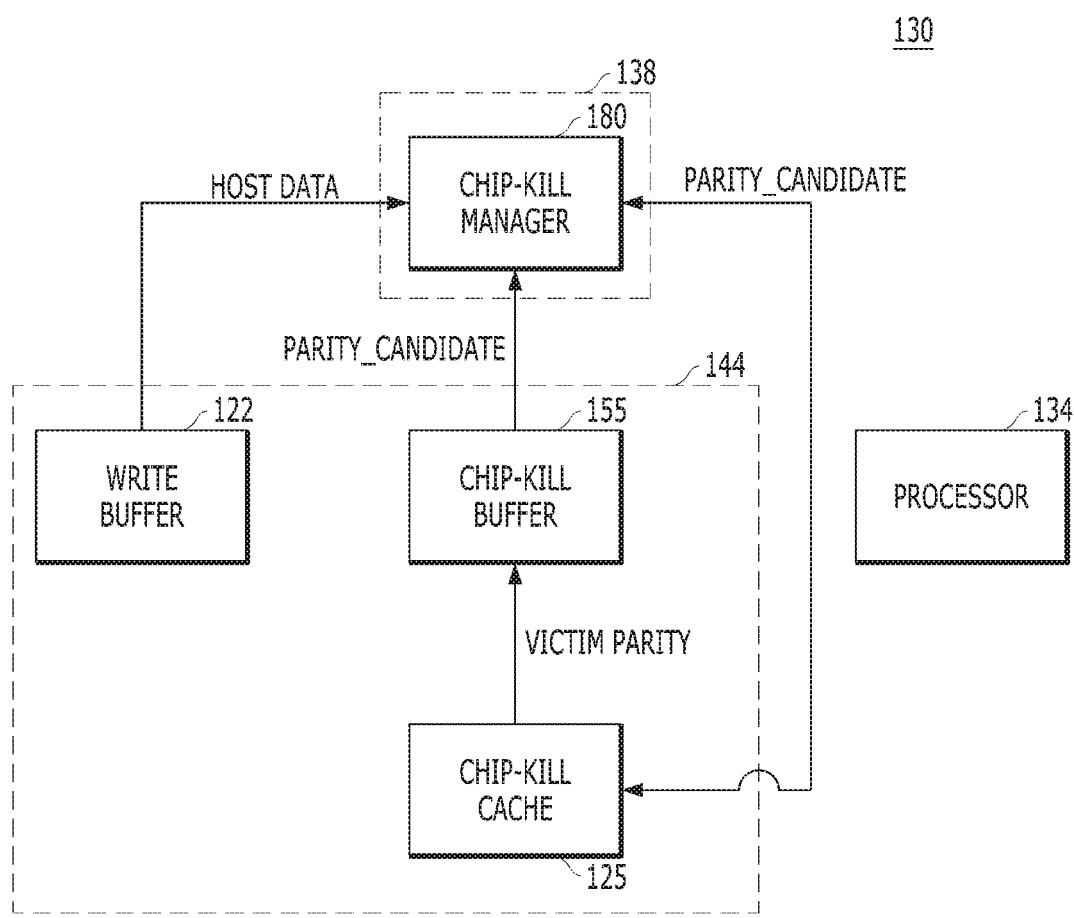
FIG. 6 is a block diagram illustrating in detail a data processing system in accordance with an embodiment of the present invention.

FIG. 6 is a block diagram illustrating in detail the data processing system 100 in accordance with the embodiment of the present invention. It is noted that FIG. 6 illustrates only the constituent elements related to the present invention in the data processing system 100 shown in FIG. 1.

Referring to FIG. 6, the controller 130 may include the memory 144, the ECC component 138, and the processor 134. The memory 144 may include a write buffer 122, a chip-kill cache 125, and a chip-kill buffer 155. Also, the ECC component 138 may include a chip-kill manager 180.

The write buffer 122 may buffer host data provided from the host 102. The write buffer 122 may be realized with a DRAM.

The processor 134 may classify (or divide) the host data buffered in the write buffer 122 for each open block. The processor 134 may determine whether or not the classified host data includes a last piece of data. When the host data does not include the last piece of data, the processor 134 may control the memory device 150 to program the host data for as much as the write stripe unit in an open block. For example, when the host data for the first open block does not include the last piece of data and the host data corresponds to as much as the write stripe unit which is buffered in the write buffer 122, the processor 134 may control the memory device 150 to program the host data in the first open block.

Also, the processor 134 may provide the chip-kill manager 180 with the host data for the open block while programming the host data in the open block. For example, the processor 134 may provide the chip-kill manager 180 with the host data for the first open block.

When the host data includes the last piece of data, the processor 134 may control the memory device 150 to program the host data whose size is smaller than the write stripe unit by one page size in the open block, and provide the chip-kill manager 180 with the host data while the program operation is performed on the host data.

The processor 134 may determine whether or not a cache hit of the host data for the first open block provided from the write buffer 122 is performed. When the chip-kill cache 125 caches a first chip-kill parity candidate for the first open block, the processor 134 may determine the host data for the first open block as a cache hit. In the case of a cache hit, the processor 134 may read the first chip-kill parity candidate from the chip-kill cache 125 and provide the chip kill manager 180 with the read first chip-kill parity candidate PARITY_CANDIDATE.

The chip-kill manager 180 may perform a chip-kill parity generation operation of performing an XOR operation on the pieces of the host data HOST DATA for the first open block and the first chip-kill parity candidate PARITY_CANDIDATE. As described above with reference to FIGS. 5A to 5C, the chip-kill manager 180 may perform an XOR operation on any one piece of data among the pieces of the host data and the read first chip-kill parity candidate and cache the XOR operation result in the chip-kill cache 125. The processor 134 may read the cached XOR operation result and provide the chip-kill manager 180 with the cached XOR operation. Then, the chip-kill manager 180 may perform an XOR operation on the provided XOR operation result and another piece of the host data. The chip-kill manager 180 and the processor 134 may perform a chip-kill parity generation operation by repeatedly performing the above-described operation on all of the pieces of the host data.

When the chip-kill cache 125 does not cache the first chip-kill parity candidate for the first open block, the processor 134 may determine the host data for the first open block as a cache miss. For example, when the chip-kill cache 125 caches a chip-kill parity candidate for the second open block, the processor 134 may determine the host data for the first open block as a cache miss. In the case of a cache miss, the processor 134 may be able to select a victim chip-kill parity VICTIM PARITY to be evicted from the chip-kill cache 125. The processor 134 may be able to select the victim chip-kill parity VICTIM PARITY based on various eviction policies, such as a least recently used (LRU) scheme.

The processor 134 may determine whether or not the victim chip-kill parity VICTIM PARITY is dirty. When there is the same data as the victim chip-kill parity VICTIM PARITY in the chip-kill buffer 155, the processor 134 may determine that the victim chip-kill parity VICTIM PARITY is clean. When there is not the same data as the victim chip-kill parity VICTIM PARITY in the chip-kill buffer 155, the processor 134 may determine that the victim chip-kill parity VICTIM PARITY is dirty. When the victim chip-kill parity VICTIM PARITY is clean, the processor 134 may delete the victim chip-kill parity VICTIM PARITY from the chip-kill cache 125 without performing an additional operation. When the victim chip-kill parity VICTIM PARITY is dirty, the processor 134 may buffer the victim chip-kill parity VICTIM PARITY in the chip-kill buffer 155 and then delete the victim chip-kill parity VICTIM PARITY from the chip-kill cache 125.

When the host data for the first open block is a cache miss, the processor 134 may read the first chip-kill parity candidate PARITY_CANDIDATE for the first open block from the chip-kill buffer 155 and provide the chip-kill manager 180 with the read first chip-kill parity candidate. The chip-kill manager 180 may perform an XOR operation on the chip-kill parity candidate and a first piece of the host data and cache the XOR operation result in the chip-kill cache 125. The processor 134 may read the first chip-kill parity candidate that is cached in the chip-kill cache 125 and provide the chip kill manager 180 with the read first chip-kill parity candidate. The chip-kill manager 180 may select one piece among the remaining pieces of the host data and perform an XOR operation on the selected one piece and the first chip-kill parity candidate. When the host data includes the last piece of data, the chip-kill manager 180 may generate a chip-kill parity by performing an XOR operation on the last piece of data and the chip-kill parity candidate, and provide the memory device 150 with the generated chip-kill parity, and the processor 134 may control the memory device 150 to program the chip-kill parity in the first open block.

The processor 134, which is described above with reference to FIGS. 1 and 6, may be realized as hardware of the memory system 110, and it may include the chip-kill cache 125.

Figure 7:
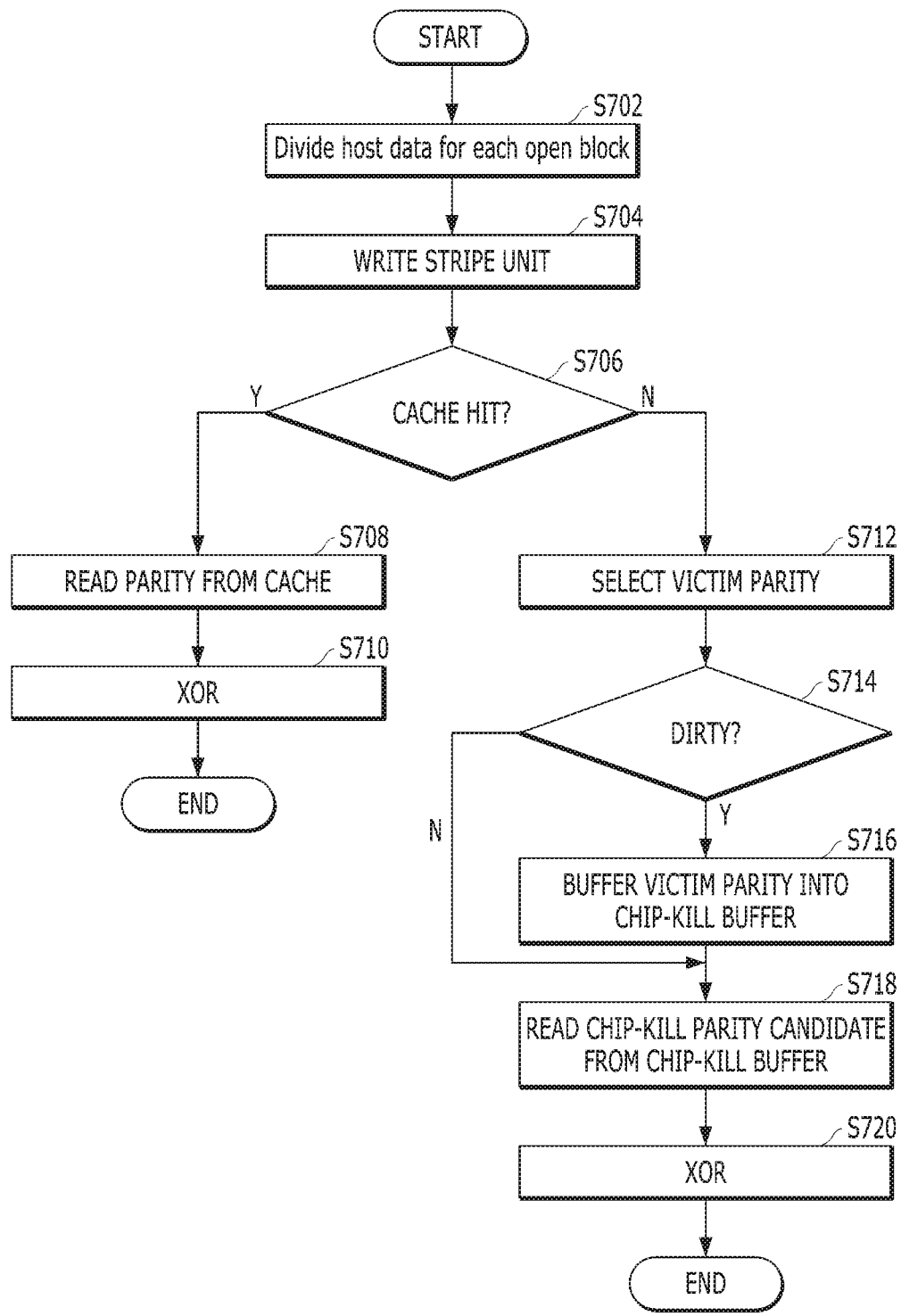
FIG. 7 is a flowchart describing an operating process of the memory system in accordance with an exemplary embodiment of the present invention.

FIG. 7 is a flowchart illustrating an operating process of the memory system 110 in accordance with an exemplary embodiment of the present invention.

Referring to FIG. 7, in step S702, the processor 134 may divide host data buffered in the write buffer 122 for each open block. For example, the processor 134 may divide the host data into a host data for a first open block and a host data for a second open block.

In step S704, the processor 134 may measure the size of the host data for each open block. When the host data does not include the last piece of data, the processor 134 may provide the chip-kill manager 180 with host data for as much as a write stripe unit. When the host data includes the last piece of data, the processor 134 may provide the chip-kill manager 180 with host data whose size is smaller by one page size than the write stripe unit. Also, the processor 134 may control the memory device 150 to program the host data provided to the chip-kill manager 180 in an open block.

In step S706, the processor 134 may determine whether or not the host data provided to the chip-kill manager 180 is a cache hit. When a chip-kill parity candidate of an open block for the host data is cached in the chip-kill cache 125, the processor 134 may determine the host data as a cache hit. When a chip-kill parity candidate of an open block for the host data is not cached in the chip-kill cache 125, the processor 134 may determine the host data as a cache miss. When the processor 134 provides the chip-kill manager 180 with the host data and the chip-kill parity candidate for the first open block is cached in the chip-kill cache 125 while the host data for the first open block is being programmed into the first open block, the processor 134 may determine it as a cache hit. When the processor 134 provides the chip-kill manager 180 with the host data and the chip-kill parity candidate for the second open block is not cached in the chip-kill cache 125 while the host data for the second open block is being programmed in the second open block, the processor 134 may determine it as a cache miss.

In the case of a cache hit ('Y' in the step S706), in step S708, the processor 134 may read the chip-kill parity candidate cached in the chip-kill cache 125 and provide the chip-kill manager 180 with the read chip-kill parity candidate. When the processor 134 provides the chip-kill manager 180 with the host data and the chip-kill parity candidate for the first open block is cached in the chip-kill cache 125 while the host data for the first open block is being programmed into the first open block, the processor 134 may read the chip-kill parity candidate for the first open block from the chip-kill cache 125 and provide the chip-kill manager 180 with the read chip-kill parity candidate.

In step S710, the chip-kill manager 180 may perform a chip-kill parity generation operation by performing an XOR operation on the provided host data and the chip-kill parity candidate. When the host data includes a first piece of data and a second piece of data, the chip-kill manager 180 may generate updated chip-kill parity candidate by performing an XOR operation on the first piece of data and the chip-kill parity candidate. The chip-kill manager 180 may cache the chip-kill parity candidate in the chip-kill cache 125, and generate updated chip-kill parity candidate by reading the chip-kill parity candidate and performing an XOR operation on the read chip-kill parity candidate and the second piece of data. The chip-kill manager 180 may cache the updated chip-kill parity candidate in the chip-kill cache 125.

When the host data includes the last piece of data, the chip-kill manager 180 may perform an XOR operation on the last piece of data and the chip-kill parity candidate to generate a chip-kill parity and provide the memory device 150 with the chip-kill parity. The processor 134 may control the memory device 150 to program the chip-kill parity in an open block. When the second piece is a last piece of data, the chip-kill manager 180 may perform an XOR operation on the chip-kill parity candidate and the second piece of data to generate a chip-kill parity and provide the memory device 150 with the chip-kill parity. The processor 134 may control the memory device 150 to program the chip-kill parity in an open block.

In the case of a cache miss ('N' in the step S706), in step S712, the processor 134 may select a victim chip-kill parity among the chip-kill parity candidates that are cached in the chip-kill cache 125. The processor 134 may select the victim chip-kill parity based on various eviction policies, such as a least recently used (LRU) scheme. However, when there is enough free space in the chip-kill cache 125, the processor 134 may not evict the victim chip-kill parity.

In step S714, the processor 134 may determine whether or not the victim chip-kill parity is dirty. When there is the same data as the victim chip-kill parity in the chip-kill buffer 155, the processor 134 may determine that the victim chip-kill parity is clean. When there is not the same data as the victim chip-kill parity in the chip-kill buffer 155, the processor 134 may determine that the victim chip-kill parity is dirty.

When the victim chip-kill parity is dirty ('Y' in the step S714), in step S716, the processor 134 may buffer the victim chip-kill parity in the chip-kill buffer 155 and then delete the victim chip-kill parity from the chip-kill cache 125. When the victim chip-kill parity is clean ('N' in the step S714), the processor 134 may delete the victim chip-kill parity from the chip-kill cache 125 without performing the operation of step S716.

In step S718, the processor 134 may read the chip-kill parity candidate from the chip-kill buffer 155 and provide the chip kill manager 180 with the read chip-kill parity candidate. For example, the processor 134 may provide the chip kill manager 180 with the host data for the second open block while programming the host data for the second open block into the second open block. When the chip-kill parity candidate for the second open block is not cached in the chip-kill cache 125, the processor 134 may read the chip-kill parity candidate for the second open block from the chip-kill buffer 155 and provide the chip-kill manager 180 with the read chip-kill parity candidate. However, when the host data includes the start piece of data, the chip-kill parity candidate for the start piece of data does not exist in the chip-kill buffer 155. Therefore, the processor 134 may not perform a chip-kill parity candidate read operation but may cache the start piece of data in the chip-kill cache 125.

In step S720, the chip-kill manager 180 may perform a chip-kill parity generation operation by performing an XOR operation on the chip-kill parity candidate and the host data provided in the step S718. When the host data includes the first piece of data and the second piece of data, the chip-kill manager 180 may generate updated chip-kill parity candidate by performing an XOR operation on the first piece of data and the chip-kill parity candidate. The chip-kill manager 180 may generate updated chip-kill parity candidate by caching the chip-kill parity candidate in the chip-kill cache 125, reading the chip-kill parity candidate, and performing an XOR operation on the read chip-kill parity candidate and the second piece of data. The chip-kill manager 180 may cache the updated chip-kill parity candidate in the chip-kill cache 125.

When the host data includes the last piece of data, the chip-kill manager 180 may be able to provide the memory device 150 with the chip-kill parity which is generated by performing an XOR operation on the last piece of data and the chip-kill parity candidate. The processor 134 may control the memory device 150 to program the chip-kill parity in an open block. When the second piece is the last piece of data, the chip-kill manager 180 may be able to provide the memory device 150 with the chip-kill parity which is generated by performing an XOR operation on the chip-kill parity candidate and the second piece of data. The processor 134 may control the memory device 150 to program the chip-kill parity in an open block.

According to embodiments of the present invention, the memory system may quickly generate a large amount of chip-kill parities using a chip-kill cache having a large bandwidth and a chip-kill buffer having a large capacity.

While the present invention has been described with respect to the specific embodiments, it will be apparent to those skilled in the art that various changes and modifications may be made without departing from the spirit and scope of the invention as defined in the following claims.

What is claimed is:

1. A memory system comprising:
    a memory device;
    a write buffer suitable for buffering a first host data and a second host data;
    a chip-kill cache suitable for caching one among a first chip-kill parity candidate and a second chip-kill parity candidate for the first host data and the second host data, respectively;
    a chip-kill buffer suitable for buffering the first chip-kill parity candidate when the first chip-kill parity candidate cached in the chip-kill cache is evicted from the chip-kill cache;
    a chip-kill manager suitable for generating a first chip-kill parity by performing an XOR operation on the first host data and the first chip-kill parity candidate and generating a second chip-kill parity by performing an XOR operation on the second host data and the second chip-kill parity candidate; and
    a processor suitable for controlling the memory device to program the first host data and the first chip-kill parity into a first open block, and to program the second host data and the second chip-kill parity into a second open block,
    wherein the chip-kill buffer has a larger capacity than the chip-kill cache, and
    wherein, when the first chip-kill parity candidate is a cache hit in the chip-kill cache, the processor controls the chip-kill manager to read the first chip-kill parity candidate from the chip-kill cache and update the read first chip-kill parity candidate, and when the first chip-kill parity candidate is a cache miss in the chip-kill cache, the processor controls the chip-kill manager to read the first chip-kill parity candidate from the chip-kill buffer and update the read first chip-kill parity candidate.

2. The memory system of claim 1, wherein, when a size of the first host data buffered in the write buffer reaches a set write stripe unit, the processor controls the memory device to program the first host data in the first open block.

3. The memory system of claim 2, wherein the write stripe unit is a sum of sizes of pages that are located at the same index of a super memory block.

4. The memory system of claim 2, wherein the processor determines whether the first host data is a cache hit or a cache miss, while a program operation is performed on the first open block, and
    the cache hit includes a case that the first chip-kill parity candidate is cached in the chip-kill cache.

5. The memory system of claim 4, wherein the cache miss includes a case that the second chip-kill parity candidate is cached in the chip-kill cache.

6. The memory system of claim 5, wherein, when the cached second chip-kill parity candidate is dirty and there is no remaining space in the chip-kill cache, the processor evicts the second chip-kill parity candidate from the chip-kill cache and writes the evicted second chip-kill parity candidate into the chip-kill buffer.

7. The memory system of claim 5, wherein, when the cached second chip-kill parity candidate is clean, the processor deletes the second chip-kill parity candidate from the chip-kill cache.

8. The memory system of claim 2, wherein, when the first host data includes a first piece of data and a second piece of data and the first piece of data includes a start piece of data for the first open block,
    the processor controls the chip-kill manager to cache the first piece of data in the chip-kill cache and to cache the first chip-kill parity candidate which is generated by performing an XOR operation on the first piece of data and the second piece of data in the chip-kill cache.

9. The memory system of claim 8, wherein, when the second piece of data includes a last piece of data,
    the processor controls the memory device to program the first chip-kill parity which is generated by performing an XOR operation on the first chip-kill parity candidate and the second piece of data that are cached in the chip-kill cache into the first open block.

10. The memory system of claim 9, wherein the start piece of data is programmed into a first page of the first open block, and
    the last piece of data is programmed into the last page of the first open block except for the first chip-kill parity.

11. A method for operating a memory system, the method comprising:
    buffering a first host data and a second host data in a write buffer;
    caching one among a first chip-kill parity candidate and a second chip-kill parity candidate for the first host data and the second host data in a chip-kill cache, respectively;
    buffering the first chip-kill parity candidate into a chip-kill buffer when the first chip-kill parity candidate cached in the chip-kill cache is evicted from the chip-kill cache;
    generating a first chip-kill parity by performing an XOR operation on the first host data and the first chip-kill parity candidate and generating a second chip-kill parity by performing an XOR operation on the second host data and the second chip-kill parity candidate; and
    programming the first host data and the first chip-kill parity into a first open block and programming the second host data and the second chip-kill parity into a second open block,
    wherein, when the first chip-kill parity candidate is a cache hit in the chip-kill cache, the first chip-kill parity candidate from the chip-kill cache is read and updated, and when the first chip-kill parity candidate is a cache miss in the chip-kill cache, the first chip-kill parity candidate from the chip-kill buffer is read and updated, the chip-kill buffer having a larger capacity than the chip-kill cache.

12. The method of claim 11, further comprising:
    when a size of the first host data buffered in the write buffer reaches a set write stripe unit, programming the first host data in the first open block.

13. The method of claim 12, wherein the write stripe unit is a sum of sizes of pages that are located at the same index of a super memory block.

14. The method of claim 12, wherein the cache hit includes a case that the first chip-kill parity candidate is cached in the chip-kill cache.

15. The method of claim 12, wherein the cache miss includes a case that the second chip-kill parity candidate is cached in the chip-kill cache.

16. The method of claim 15, further comprising:
when the cached second chip-kill parity candidate is dirty and there is no remaining space in the chip-kill cache, evicting the second chip-kill parity candidate from the chip-kill cache and writing the evicted second chip-kill parity candidate into the chip-kill buffer.

17. The method of claim 15, further comprising:
when the cached second chip-kill parity candidate is clean, deleting the second chip-kill parity candidate from the chip-kill cache.

18. The method of claim 12, further comprising:
when the first host data includes a first piece of data and a second piece of data and the first piece of data includes a start piece of data for the first open block, caching the first piece of data in the chip-kill cache and caching the first chip-kill parity candidate which is generated by performing an XOR operation on the first piece of data and the second piece of data in the chip-kill cache.

19. The method of claim 18, further comprising:
when the second piece of data includes a last piece of data, programming the first chip-kill parity which is generated by performing an XOR operation on the first chip-kill parity candidate and the second piece of data that are cached in the chip-kill cache into the first open block.

20. The method of claim 19, wherein the start piece of data is programmed into a first page of the first open block, and
the last piece of data is programmed into the last page of the first open block except for the first chip-kill parity.

\* \* \* \* \*